(12) United States Patent
Al-Badran et al.

(10) Patent No.: US 11,332,994 B2
(45) Date of Patent: May 17, 2022

(54) LASER CUTTING TOOL

(71) Applicant: Saudi Arabian Oil Company, Dhahran (SA)

(72) Inventors: Mohammad Saud Al-Badran, Dhahran (SA); Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/998,753

(22) Filed: Aug. 20, 2020

(65) Prior Publication Data

US 2022/0056775 A1 Feb. 24, 2022

(51) Int. Cl.
*E21B 29/02* (2006.01)
*B23K 26/382* (2014.01)

(52) U.S. Cl.
CPC ............ *E21B 29/02* (2013.01); *B23K 26/382* (2015.10)

(58) Field of Classification Search
CPC .............................. E21B 29/02; B23K 26/382
See application file for complete search history.

(56) References Cited

U.S. PATENT DOCUMENTS

| | | | |
|---|---|---|---|
| 6,755,262 B2 | 6/2004 | Parker | |
| 6,888,097 B2 | 5/2005 | Batarseh | |
| 8,307,900 B2 | 11/2012 | Lynde et al. | |
| 9,677,339 B2 | 6/2017 | Linetskiy et al. | |
| 10,053,967 B2 | 8/2018 | Deutch et al. | |
| 10,199,798 B2 | 2/2019 | Faircloth et al. | |
| 10,221,667 B2 | 3/2019 | Montaron | |
| 10,273,787 B2 | 4/2019 | Montaron et al. | |
| 2006/0231257 A1 | 10/2006 | Reed et al. | |
| 2010/0326659 A1* | 12/2010 | Schultz | E21B 43/12 166/297 |
| 2016/0186524 A1* | 6/2016 | Faircloth | E21B 33/064 166/361 |
| 2016/0327802 A1* | 11/2016 | Bethel | G02B 6/0008 |
| 2017/0252858 A1* | 9/2017 | Zediker | E02B 17/027 |
| 2018/0066489 A1* | 3/2018 | Pipchuk | E21B 33/1208 |
| 2019/0032434 A1* | 1/2019 | Batarseh | G02B 27/0955 |
| 2020/0115962 A1 | 4/2020 | Batarseh | |

FOREIGN PATENT DOCUMENTS

| | | |
|---|---|---|
| CN | 203081295 U | 7/2013 |
| CN | 203334954 U | 12/2013 |
| WO | WO-2012/031009 A1 | 3/2012 |
| WO | WO-2019/023537 A1 | 1/2019 |

OTHER PUBLICATIONS

International Search Report for PCT/IB2020/060027, 5 pages (dated Jun. 9, 2021).
Written Opinion for PCT/IB2020/060027, 8 pages (dated June 9, 2021).

* cited by examiner

*Primary Examiner* — Christopher J Sebesta
(74) *Attorney, Agent, or Firm* — Choate, Hall & Stewart LLP; Charles E. Lyon; Peter A. Flynn

(57) ABSTRACT

A laser cutting tool includes: an optical assembly that includes a laser generator that emits an laser beam; a reflector disposed longitudinally downstream of the laser generator; a reflector reflecting the laser beam emitted from the optical assembly; a focus lens disposed laterally beside the reflector; and a timer for controlling the tool to operate for at least one predetermined amount of time. The focus lens focuses the laser beam after it passes through the reflector.

18 Claims, 6 Drawing Sheets

LASER CUTTING TOOL

FIELD

The subject matter described herein relates to apparatuses, systems, and methods for using rotatable high power laser cutting tools to cut slots in casing and cement layers in a wellbore.

BACKGROUND

Conventional wellbore perforation techniques establish flow from a hydrocarbon-bearing reservoir into the wellbore by using jet perforating guns equipped with shaped explosive charges. Such perforation techniques apply explosive force of shaped charges to a small-diameter jet that penetrates the casing and cement into the reservoir rock. This process reduces reservoir rock porosity and permeability as metal and carbon debris are forced into the perforation tunnel, while very fine grain particles plug or reduce the pore throat size. However, it is necessary to perform time-consuming and costly post-perforation operations to minimize flow restrictions into the wellbore. Developing alternative perforation methods that reduce or eliminate formation damage could significantly boost production rates, cumulative production, and overall economic returns.

SUMMARY OF THE INVENTION

The present disclosed embodiments include apparatuses, systems, and methods for using high power lasers for cutting slots in cement, casings, and/or other suitable components in a wellbore. The present disclosed embodiments may be used to enable fluids in a hydrocarbon-bearing reservoir to flow into a wellbore for oil and/or gas production. The present disclosed embodiments may provide a precise control of shape, size, and/or location of one or more targets being cut.

The present disclosed embodiments may include one or more specified slots or holes in target zone(s) (for example, annulus-shaped casings and/or cement layers) at predetermined locations (for example, depths, and/or directions). The present disclosed embodiments may establish fluid communication between a reservoir and a wellbore, and/or among microchannels that may develop in the cement or other regions in a subsurface. The present disclosed embodiments may include a plurality of slots at separate intervals to cover the entire circumference of the casing and/or cement layer(s) to ensure microchannels are found. The present disclosed embodiments may avoid cutting the entire casing, which may cause the loss of the string integrity which may result in more complications. The present disclosed embodiments may be positioned in a wellbore. The laser beam(s) from the laser cutting tool may penetrate the casing and/or cement layer(s) longitudinally (or vertically), circumferentially (or horizontally), or by any angle for creating tunnels, holes, and/or slots with controlled geometry and/or depth. The present disclosed embodiments may be used in abandoning a well or production facility, casing-casing annulus (CCA) repair, and/or offshore slot recovery.

In one respect, the present invention is directed to a laser cutting tool including: an optical assembly including a laser generator, the laser generator emitting a laser beam; a reflector disposed longitudinally downstream of the laser generator, the reflector reflecting the laser beam emitted from the optical assembly; a focus lens disposed laterally beside the reflector, the focus lens focusing the laser beam after it passes through the reflector; and a timer for controlling the tool to operate the laser beam for at least one predetermined amount of time.

In some embodiments, the laser beam operates at a power of at least about 1 kW.

In some embodiments, the tool further includes a mounting system to support the optical assembly.

In some embodiments, the tool further includes a protection cable disposed as an external layer to house the optical assembly.

In some embodiments, the tool further includes a purging knife disposed laterally behind the focus lens. The purging knife prevents debris and dust from blocking the laser beam.

In some embodiments, the reflector reshapes the laser beam.

In some embodiments, the reflector splits the laser beam.

In some embodiments, the tool is rotatable with a drill string.

In some embodiments, the focus lens includes a focal length of up to about 35 mm.

In some embodiments, the tool further includes a collimator to control at least one of a size, a shape, a location, and an orientation of the laser beam.

In some embodiments, the collimator is disposed laterally between the purging knife and the focus lens.

In some embodiments, the collimator is disposed laterally between the reflector and the focus lens.

In another aspect, the present invention is directed to a laser cutting system including: an optical assembly for emitting a laser beam in a wellbore; a lens system disposed longitudinally downstream of the optical assembly; a control system; and a target zone disposed in at least one of a first casing, a second casing, and a cement layer. The lens system reflects and focuses the laser beam emitted from the optical assembly. The control system controls the optical assembly and the lens system to operate at predetermined locations. The control system further includes a timer. The timer controls the optical assembly and the lens system to operate the laser beam for at least one predetermined amount of time. The first casing, second casing, and cement layer are located within the wellbore and the cement layer is disposed between the first casing and the second casing.

In some embodiments, the lens system includes: a reflector including at least one of a mirror, a beam splitter, and a prism; and a focus lens for focusing the laser beam. The reflector reshapes the laser beam.

In another aspect, the present invention is directed to a method of operating a laser cutting tool in a wellbore, including: (a) lowering the laser cutting tool downhole to a first predetermined location; (b) operating the laser cutting tool for a first amount of time to cut a first slot in at least one layer of a target zone in the wellbore; (c) operating the laser cutting tool to move to a second predetermined location; (d) operating the laser cutting tool for a second amount of time to cut a second slot in at least one layer of the target zone; and (e) repeating steps (c)-(d) for a predetermined number of times.

In some embodiments, the method further includes determining the first amount of time and the second amount of time, prior to step (a).

In some embodiments, determining a first amount of time includes using a testing casing. The testing casing is produced by a 3D printer.

In some embodiments, the first amount of time is up to about 10 seconds.

In some embodiments, operating the laser cutting tool to move to a second predetermined location includes circumferentially rotating the laser cutting tool by a predetermined degree and moving the laser cutting tool to a predetermined depth in the wellbore.

In some embodiments, the predetermined degree and the predetermined number of times are such that the laser cutting tool makes a complete circular cut at the target zone.

In some embodiments, the laser cutting tool is operated by a control system.

In some embodiments, the target zone includes a nested casing. The nested casing includes at least a first casing and a second casing. The first casing is disposed inside the second casing. The first casing and second casing are concentric.

In some embodiments, the target zone further includes an annulus-shaped cement layer disposed between the first casing and the second casing.

In some embodiments, the first amount of time is up to about 60 seconds.

In some embodiments, the slot includes a rectangular shape with an aspect ratio of up to about 500:1.

In some embodiments, the slot includes a circular shape. Lowering the laser cutting tool downhole to a first predetermined location includes aiming the laser cutting tool at the target zone.

In some embodiments, the first and second slots are separated by a longitudinal distance and include approximately the same dimensions. The longitudinal distance includes up to about 200% of a longitudinal length of the first and second slots.

In some embodiments, the first and second slots include a circumferential overlap and include approximately the same dimensions. The circumferential overlap includes up to about 15% of the radial length of the first and second slots.

In some embodiments, the laser cutting tool operates at a power of at least about 4 kW.

In some embodiments, the laser beam operates at a wavelength of up to about 5000 nm.

In some embodiments, the laser generator operates at a frequency of at least about 1 kHz.

In some embodiments, the laser cutting tool operates at a power from about 4.5 kW to about 5.5 kW. The laser generator operates at a frequency from about 2.5 kHz to about 3.5 kHz. The laser beam operates at a wavelength from about 1010 nm to about 1110 nm.

In some embodiments, the method further includes repairing at least one defect in an exposed surface after operating the laser cutting tool to cut the first and second slots.

In some embodiments, the method further includes plugging the first and second slots after repairing at least one defect.

Throughout the description, where an apparatus, system or embodiment are described as having, including, or comprising specific components, or where methods are described as having, including, or comprising specific steps, it is contemplated that, additionally, there are systems, apparatuses or embodiments of the present invention that consist essentially of, or consist of, the recited components, and that there are methods according to the present invention that consist essentially of, or consist of, the recited processing steps.

It should be understood that the order of steps or order for performing certain actions is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which.

DESCRIPTION OF CERTAIN EMBODIMENTS OF THE INVENTION

Figure 1:
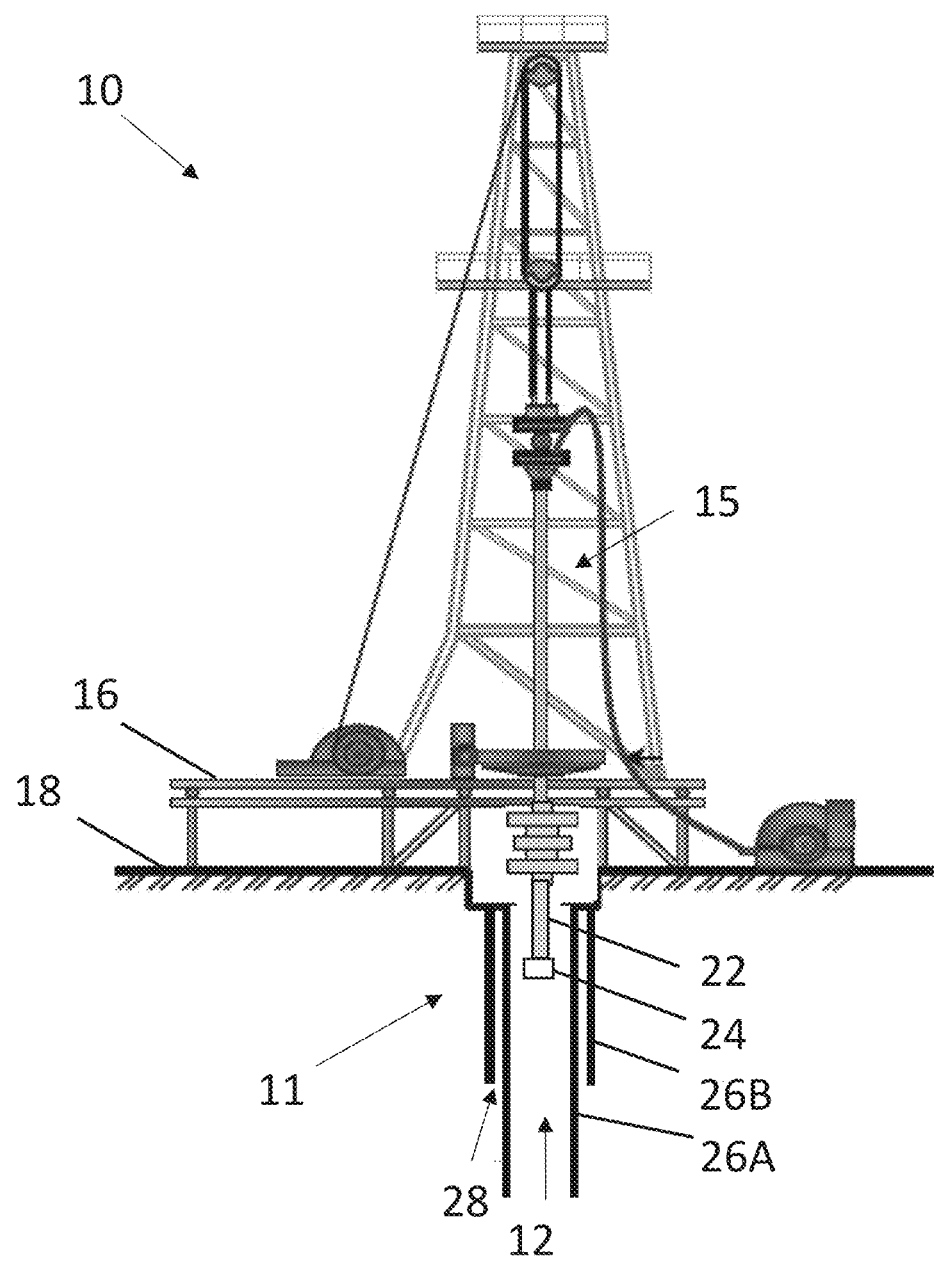
FIG. 1 illustrates a side view of an oil rig and a laser cutting tool system, according to aspects of the present embodiments.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

In downhole applications in oil and gas wells, microchannels may develop in cement, casings, and/or other barriers that are put into place to provide isolation between reservoirs, aquifers, and/or surface. The microchannels may occur as micro separation between cement and casing or within cement layer(s) because of improper design of the cement slurry or due to defects that occur while the cement is being poured and/or setting. The existence of microchannels may result in the well not being properly sealed off, which may result in production reduction and expensive remedial costs. Therefore, an access and/or repair may be needed for microchannels.

Existing methods to achieve access to microchannels (for example, in a casing-casing annulus (CCA)) include perforations and section milling of an inner casing. Perforations may need multiple attempts to achieve access to the micro channel, and may result in unexpected damage to a casing. The other method of section milling the casing may create access to only an inner CCA that is accessible via the interior of the borehole.

The present embodiments are directed to apparatuses, systems, and methods for high power laser applications that may be tunable and may generate high intensity laser beam(s) to cut through a steel and/or cement layer. The present embodiments may provide precise control of the shape, size, location (for example, depth), and/or power intensity of laser beam(s) to achieve desired cuts in target zone(s) without damaging unwanted zones. The present embodiments may provide a plurality of slots in longitudinal/vertical and circumferential/horizontal directions to increase the likelihood of finding microchannel(s) while maintaining the integrity (for example, the structural integrity) of the location where the target is being cut. The present embodiments may provide cuts in multiple casings and cement to access more than one CCA for repairing a CCA, testing well integrity, and/or recovering a slot (for example, installing a new well in the slot of a well that no longer produces oil and/or gas so that an existing offshore platform may continue to be used.)

FIG. 1 illustrates a side view of an oil rig 10 and a laser cutting tool system 11, according to aspects of the present embodiments. A wellbore 12 may be formed by using the oil rig 10. The wellbore 12 may be disposed on the ground, or in subsurface. The laser cutting tool system 11 may include a laser cutting tool 24, one or more annulus-shaped casings 26A, 26B, and cement layer(s) (not shown). The annulus-shaped cement layer(s) may be disposed between the one or more casings 26A and 26B, and/or beween the casings and the borehole walls of the wellbore 12. The oil rig 10 may include a rig floor 16. Work crews may work primarily on a rig floor 16 above ground 18. In some embodiments, work crews may drill in the wellbore 12 using a drill string 22. In some embodiments, work crews may use a laser cutting tool 24 that is operatively coupled to the drill string 22. In some embodiments, work crews may operate some of rig components 15 (for example, rotary tables, blow-out preventers (BOP), drill strings 22, motors, pumps, and/or other components) disposed near the rig floor 16 or within the wellbore 12 for rotating the laser cutting tool 24.

Referring still to FIG. 1, the wellbore 12 may be encased by the one or more casings (for example, nested casings), such as a first casing 26A and a second casing 26B. The first casing 26A may be disposed inside the second casing 26B. In some embodiments, the entire nested casing 26A, 26B (and any third, fourth, fifth or higher number nested casings) are disposed within the wellbore 12. The one or more casings (for example, the first casing 26A and the second casing 26B) may be used to stabilize the wellbore 12, keep contamination (for example, silt, deposits, debris, and/or sand) and/or fluids (for example, water) out of an oil stream, and/or to control well pressures during operations (for example, drilling, production, and/or workover). In some embodiments, the laser cutting tool 24 may be operated to cut slots in the one or more casings (for example, 26A and 26B), while in other embodiments, the laser cutting tool 24 may be operated to cut slots in the annulus-shaped cement layer(s).

Figure 2:
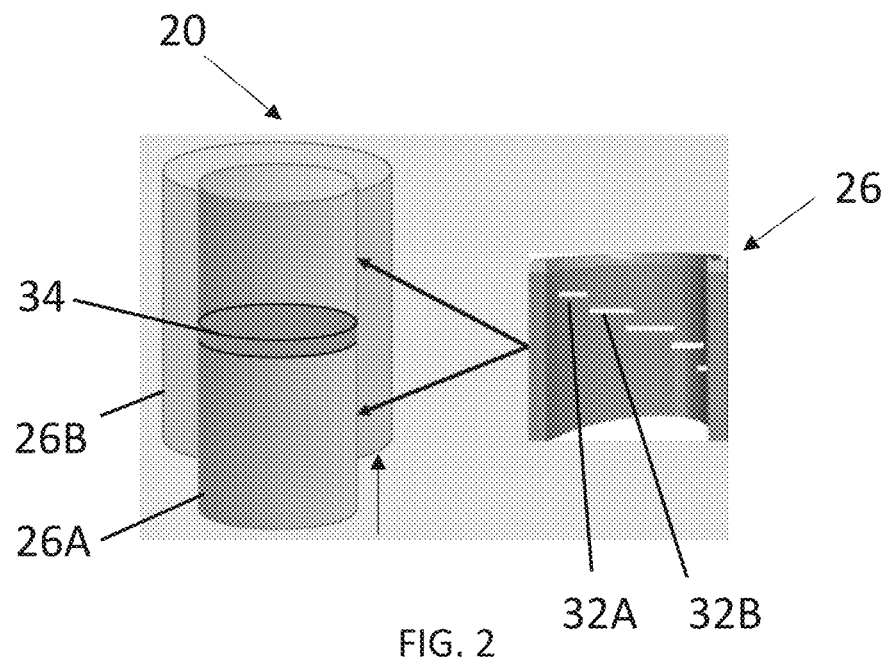
FIG. 2 illustrates a perspective view of nested casings, according to aspects of the present embodiments.

FIG. 2 illustrates a perspective view of nested casings 20 within the wellbore 12, according to aspects of the present embodiments. The nested casings 20 may include one or more casings (for example, the first casing 26A and second casing 26B). The laser cutting tool 24 (not shown) may be operated (for example, lowered, lifted, rotated, and/or aimed) to cut a plurality of slots or holes (for example, 32A, 32B) in a target zone 34 (for example, an annular zone of the casing 26A or 26B, and/or cement layer(s)). The target zone 34 may include a predetermined thickness. The one or more slots may be made at predetermined depths, shapes, and/or locations such that adjacent slots (for example, 32A and 32B) are spaced in a longitudinal direction while also overlapping in a circumferential (or horizontal) direction. In addition, the plurality of slots may cover the entire circumference of the downhole object 34 and/or the entire longitudinal length of the casing 26A, 26B to ensure a microchannel is found.

Figure 3:
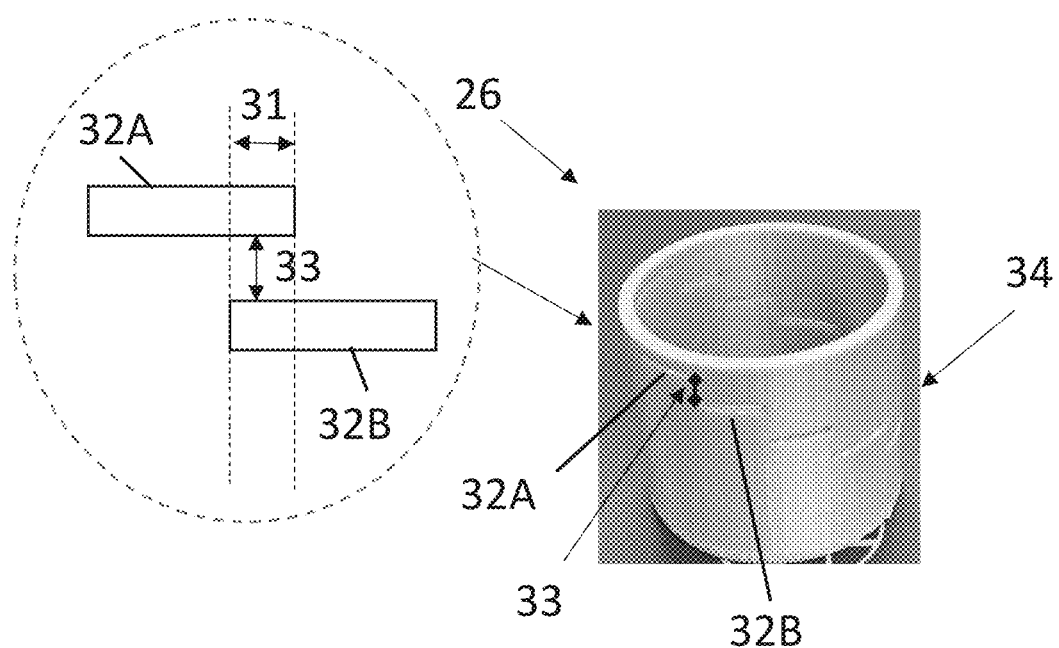
FIG. 3 illustrates a perspective view of a casing, according to aspects of the present embodiments.

FIG. 3 illustrates a perspective view of a casing 26, according to aspects of the present embodiments. The casing 26 may include the plurality of slots (for example, 32A, 32B) that are cut by the laser cutting tool 24. In some embodiments, the casing 26 may be a testing casing produced by a 3D printer (not shown) for determining predetermined parameters (for example, amounts of time for operating the laser cutting tool 24, numbers of cuts, shapes of a plurality of slots, location of slots, and other parameters as necessary to determine how long and at what laser operating powers and/or frequencies the laser cutting tool 24 should be operated in order to make the desired cuts). In some embodiments, the predetermined parameters may be determined through experiments. In other embodiments, the predetermined parameters may be determined calculationally or numerically based on previous experience and results.

Referring still to FIG. 3, in some embodiments, the predetermined parameters may include at least one amount of time for operating the laser cutting tool 24 to cut through a target zone 34. In some embodiments, the predetermined amount of time may depend on the target material (for example, carbon steel, stainless steel, aluminum, titanium, fiberglass, alloys, plastic, and/or cement), the thickness of the target zone 34 (for example, from about 1 to about 5 inches), properties of the purging knife 54 (not shown), and/or the type of the laser generator 39 (not shown).

Referring still to FIG. 3, in some embodiments, the predetermined parameters may include a predetermined amount of cuts based on tests (for example, load test and/or trial-and-error). In some embodiments, each of the cuts produces a slot that covers a fraction of a circle. In some embodiments, the predetermined number of cuts may be 2, and each of the cuts produces a slot that covers about 180 degrees of a circle (that is, a half of a full circle). In some embodiments, the predetermined number of cuts may be 3, and each of the cuts produces a slot that covers about 120 degrees of a circle. In some embodiments, the predetermined number of cuts may be 4, and each of the cuts produces a slot that covers about 90 degrees of a circle. In some embodiments, the predetermined number of cuts may be 6, and each of the cuts produces a slot that covers about 60 degrees of a circle. In some embodiments, the predetermined number of cuts may be 8, and each of the cuts produces a slot that covers about 45 degrees of a circle. In some embodiments, the predetermined number of cuts may be 12, and each of the cuts produces a slot that covers about 30 degrees of a circle. In some embodiments, the predetermined number of cuts may be from about 1 to about 100, about 2 to about 100, about 3 to about 50, about 4 to about 50, about 5 to about 20, about 6 to about 20, about 7 to about 10, or about 8 to about 10.

Referring still to FIG. 3, in some embodiments, the predetermined parameters may include a shape of the plurality of slots (for example, 32A, 32B). In some embodiments, the shape of the plurality of slots (for example, 32A, 32B) may include an ellipse, a circle, a rectangle, and/or other suitable shapes. In some embodiments, the shape of the plurality of slots (for example, 32A, 32B) may include a rectangle with an aspect ratio (for example, the ratio of the length to the width) of up to about 500:1, about 400:1, about 300:1, about 200:1, about 100:1, about 50:1, about 10:1, about 5:1, about 2:1, about 1:1, about 1:2, about 1:5, about 1:10, about 1:50, and about 1:100, as well as other subranges therebetween. In some embodiments, the rectangular slot includes an aspect ratio from about 5:1 to about 20:1, or from about 8:1 to about 15:1, or from about 10:1 to about 13:1.

Referring still to FIG. 3, the plurality of slots (for example, 32A, 32B) may be cut at predetermined locations such that adjacent slots (for example, 32A and 32B) are next to or near each other longitudinally, while the plurality of slots (for example, 32A and 32B) covers the entire circumference of the casing 26. Stated otherwise, every circumferential location may be covered by the plurality of slots 32A, 32B, but some slots of the plurality of slots (for example, 32A and 32B) may be at different depths (or vertical locations) than other slots of the plurality of slots (for example, 32A, 32B). In addition, any given slot does not cover the entire circumference, but collectively, the plurality of slots 32A, 32B may cover the entire circumference. In some embodiments, the adjacent slots comprise approximately the same dimensions. In some embodiments, the plurality of slots comprise approximately the same dimensions.

Referring still to FIG. 3, in some embodiments, one slot (for example, 32B) of two adjacent slots may be longitudinally separated from the other slot (for example, 32A) of the two adjacent slots with a longitudinal distance 33 to maintain the integrity of the casing (for example, the casing 26) being cut. In some embodiments, one slot (for example, 32B) of the adjacent slots may include a circumferential overlap 31 with the other slot (for example, 32A) of the two adjacent slots to ensure the plurality of slots (for example, 32A, 32B) covers an entire circumference. In some embodiments, the size of the longitudinal distance 33 and the circumferential overlap may be pre-determined (for example, based on a casing size and/or required strength of the remaining casing after being cut). In some embodiments, the circumferential overlap may include a size of up to about 1%, about 5%, about 10%, about 15%, about 20%, or about 30% of the radial length of a slot of the plurality of slots (for example, 32A or 32B). In some embodiments, the circumferential overlap may include a size of about 5% to about 10% of the radial length of a slot of the plurality of slots (for example, 32A or 32B). In some embodiments, the longitudinal distance 33 may be up to about 1%, about 5%, about 25%, about 50%, about 75%, about 100%, or about 200% of the longitudinal width of a slot of the plurality of slots (for example, 32A, 32B). In some embodiments, the longitudinal distance 33 may be at least about 1%, about 5%, about 25%, about 50%, about 75%, about 100%, or about 200% of the longitudinal width of a slot of the plurality of slots (for example, 32A, 32B). In some embodiments, the longitudinal distance 33 may be from about 5% to about 10% of the longitudinal width of a slot of the plurality of slots (for example, 32A, 32B). In some embodiments, the longitudinal distance 33 may be from about 10% to about 100% of the longitudinal width of a slot of the plurality of slots (for example, 32A, 32B). In some embodiments, the longitudinal distance 33 may be from about 100% to about 200% of the longitudinal width of a slot of the plurality of slots (for example, 32A, 32B). In some embodiments, separated longitudinal cuts may result in the casing 26 maintaining a higher degree of structural integrity than continuous cuts. In some embodiments, the longitudinal distance 33 and the circumferential overlap may be predetermined independently.

Figure 4:
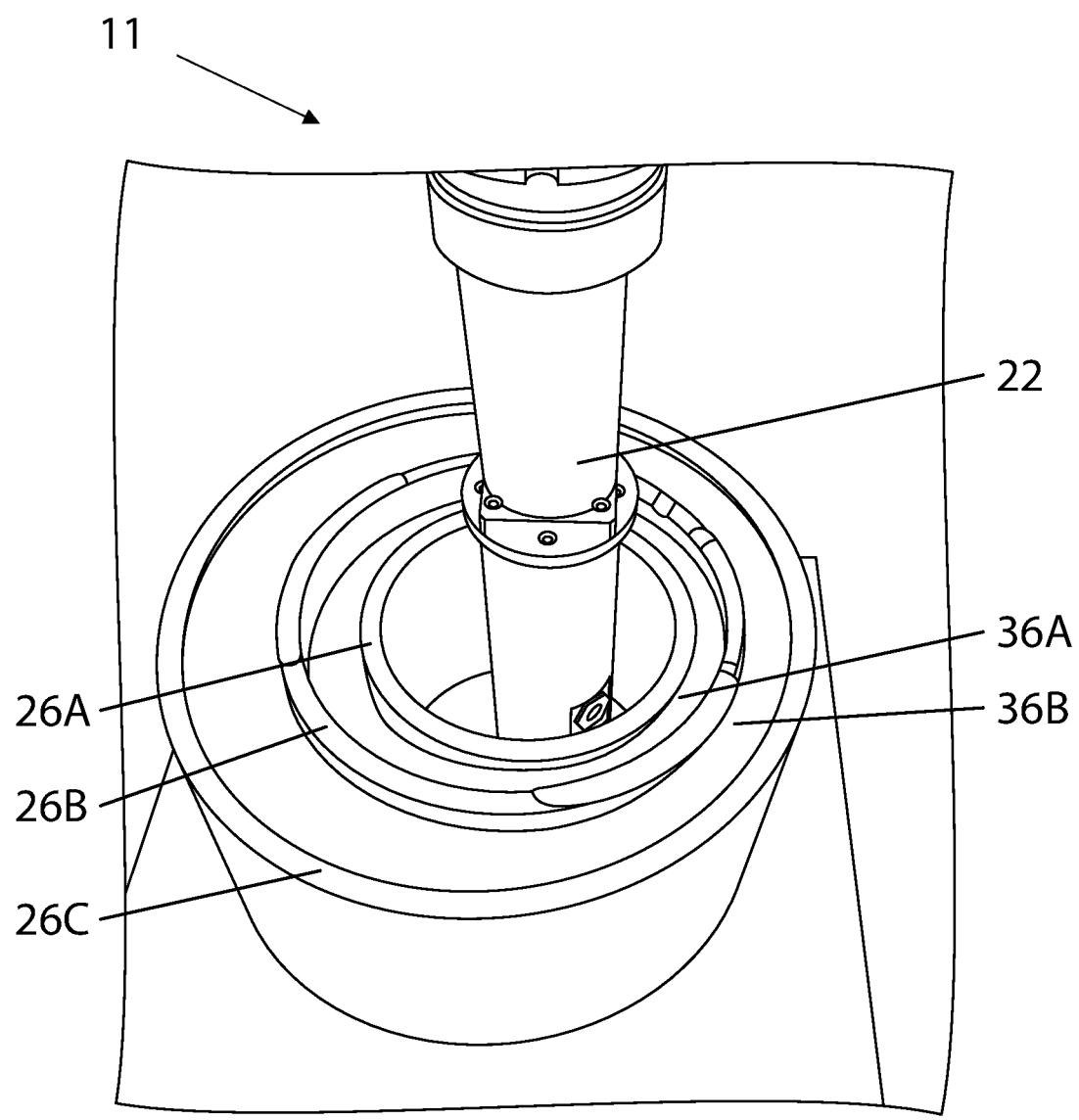
FIG. 4 illustrates a perspective view of a laser cutting tool system in a wellbore, according to aspects of the present embodiments.

FIG. 4 illustrates a perspective view of a laser cutting tool system 11 in a wellbore 12, according to aspects of the present embodiments. The system 11 may include one or more concentric and/or nested casings (for example, a first casing 26A, a second casing 26B, and a third casing 26C), where each of the concentric casings 26A, 26B, and 26C may include a different diameter. The system 11 may include one or more annulus-shaped cement layers (for example, a first cement layer 36A disposed between the first casing 26A and the second casing 26B, as well as a second cement layer 36B disposed between the second casing 26B and the third casing 26C). In some embodiments, the annulus-shaped cement layers (for example, 36A and 36B) may be disposed between an outer casing and a borehole wall (not shown).

Figure 5:
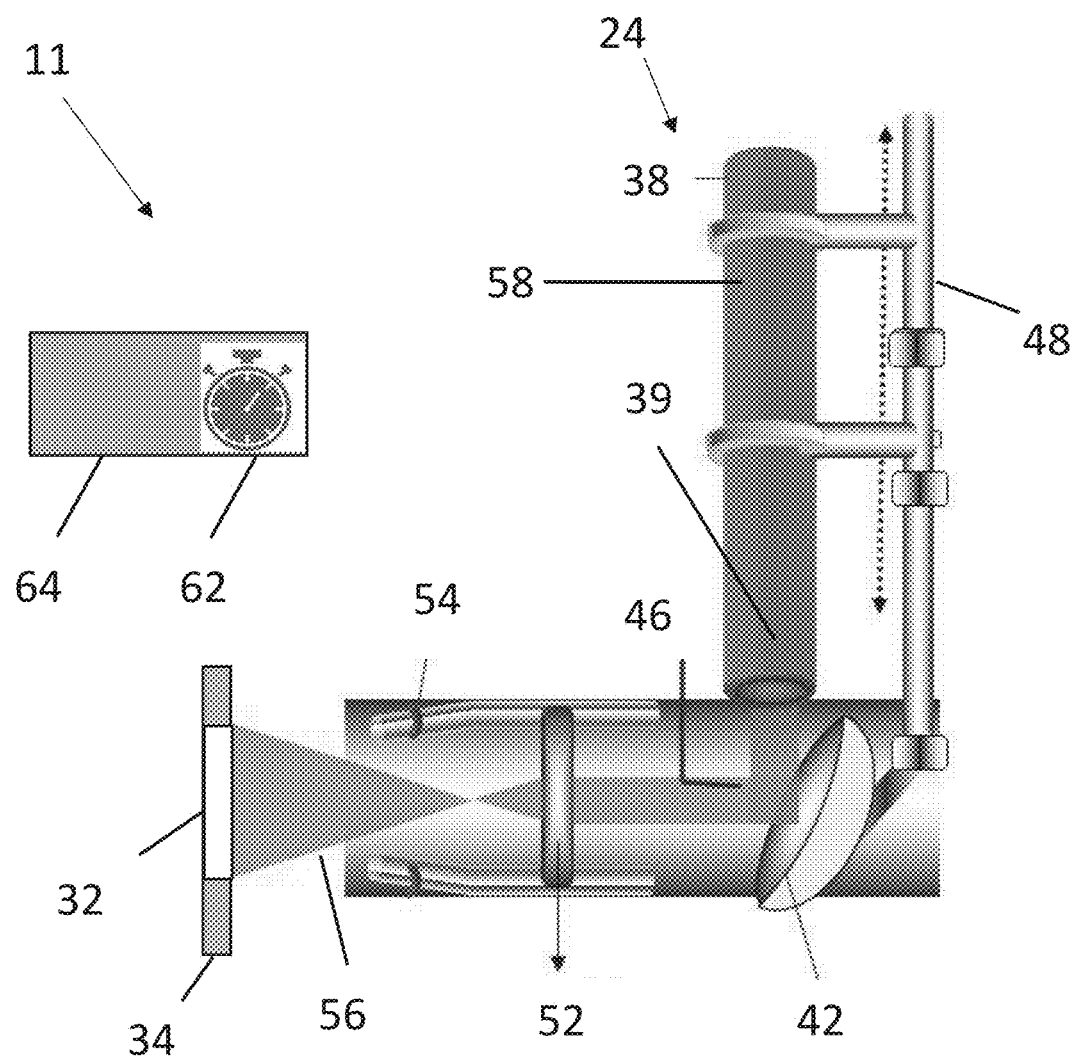
FIG. 5 illustrates a side view of a laser cutting tool, according to aspects of the present embodiments.
Figure 6:
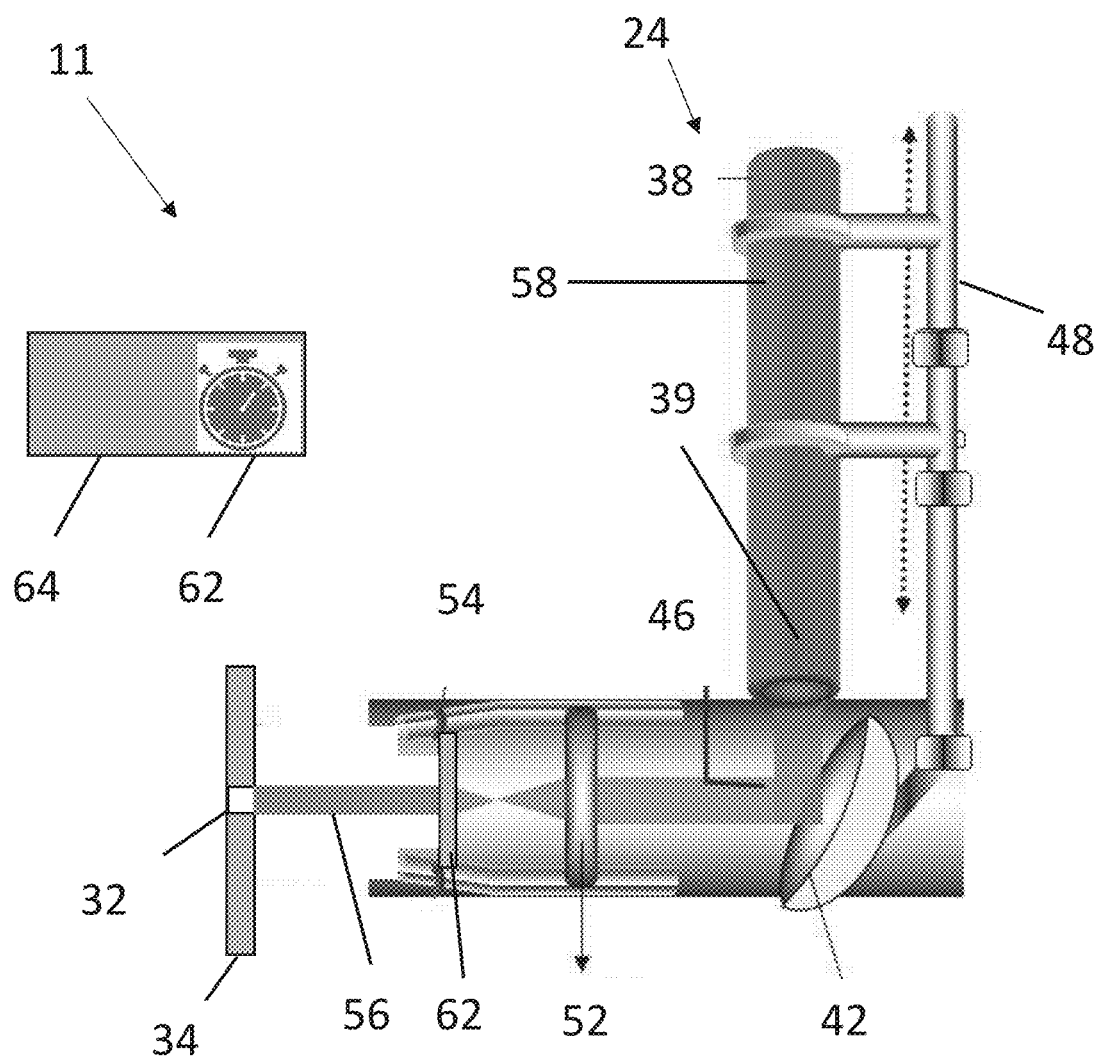
FIG. 6 illustrates a side view of a laser cutting tool, according to aspects of the present embodiments.

FIGS. 5 and 6 illustrate side views of the laser cutting tool 24, according to aspects of the present embodiments. The laser cutting tool 24 may be operatively coupled to a mounting system 48, both of which are included in the laser cutting system 11. The laser cutting tool 24 may include an optical assembly 38 inserted in the wellbore 12. The optical assembly 38 may include a laser generator 39 (for example, a fiber laser) to emit an input laser beam 46. In some embodiments, the optical assembly 38 may include a flexible laser cable such that the laser cutting tool 24 may reach more locations, such as hard-to-reach areas in the wellbore 12. The input laser beam 46 may enter a reflector 42 (for example, a mirror, a beam splitter, or a prism). The reflector 42 may be disposed longitudinally downstream of the laser generator 39. In some embodiments, the reflector 42 may reshape the orientation, size, shape, and/or number of the input laser beam 46. In some embodiments, the reflector 42 may reflect the input laser beam 46. In some embodiments, the reflector 42 may split the input laser beam 46.

Referring still to FIGS. 5 and 6, a focus lens 52 may be disposed laterally beside the reflector 42 for the input laser beam 46 to enter after it passes through the reflector 42. In some embodiments, the focus lens 52 may be preferably a short focus lens (that is, a lens with a focal length substantially less than that of a normal lens), leading the input laser beam 46 to focus over a short distance and/or to diverge quickly. The focal length may vary depending on the tool size and may be dimensioned such that the input laser beam 46 does not hit any components of the laser cutting tool 24. In some embodiments, the focal length may be from about 15 mm to about 55 mm, or from about 20 mm to about 50 mm, or from about 25 mm to about 45 mm, or from about 30 mm to about 40 mm, or about 35 mm. In some embodiments, the focus lens 52 may include a predetermined focal length, which depends on the size (for example, diameter) of a casing being cut or a drill string. In some embodiments, the focus lens 52 may include a predetermined focal length such that the output laser beam 56 is focused on the target zone 34. Therefore, in some embodiments, the focus lens 52 may include a predetermined focal length of up to about 15 mm, up to about 25 mm, up to about 35 mm, up to about 45 mm, up to about 55 mm, up to about 65 mm, up to about 75 mm, up to about 100 mm, up to about 200 mm, and/or up to about 300 mm. A purging knife 54 may be disposed laterally behind, adjacent to, and/or optically downstream of the focus lens 52 to prevent any debris or dust (for example, air, gas, or fluid) from blocking and/or damaging the laser beam and/or components in the laser cutting tool 24. An output laser beam 56 (preferably a focused beam in order to provide high intensity) may exit from the laser tool 24 to hit a target zone 34, which melts, burns, vaporizes away, and/or incinerates at least one slot of the plurality of slots 32A, 32B into the target zone 34, resulting in a high-quality slot with a desired shape, size, and/or location controlled by a control system (not shown). In some embodiments, the laser cutting tool 24 may be moved (for example, rotated circumferentially by a predetermined degree, lowered, and/or lifted) to repeat the previous operation to generate more slots of the plurality of slots 32A, 32B with controllable or predetermined sizes and shapes at predetermined locations.

In the embodiment of FIG. 6, the laser cutting tool 24 may further include at least one collimator 62 to align and/or control at least one of a size, shape, location, and/or orientation of the output laser beam 56. In some embodiments, the collimator 62 may be disposed between the purging knife 54 and the focus lens 52, while in some embodiments, the collimator 62 may be disposed between the reflector 42 and the focus lens 52.

Referring still to FIG. 6, in some embodiments, the collimator 62, with the aid of the reflector 42 and/or the focus lens 52, may cause the output laser beam 56 to create uniform and/or precise cut in thin (for example, less than 3 or 4 inches) target zones. Referring to FIGS. 5 and 6, in some embodiments, the output laser beam 56 may be divergent in thick (for example, more than 4 or 5 inches) target zones.

Referring still to FIGS. 5 and 6, the laser cutting tool 24 may include a protection cable 58 as an external layer to house and protect the optical assembly 38 and other components inside the laser cutting tool 24. In some embodiments, the protection cable 58 may isolate the optical assembly 38 and other components inside the laser cutting tool 24 from high temperature and/or high pressure from outside within the borehole. In some embodiments, the protection cable 58 may withstand the downhole conditions of fluids (for example, water or gas) and/or solids (for example, sand, rock fragments, silt, and/or other debris). In some embodiments, the outer structure of the protection cable 58 may include metals, industrial plastics, such as thermoplastics, polyether ether ketone (PEEK), steals such as austenitic steels, carbon steels, galvanized steels, and other suitable materials.

Referring still to FIGS. 5 and 6, the output laser beam 56 may be controlled by a control system 64 to include a desired and/or optimized shape, size, and/or location when exiting the laser cutting tool 24. The output laser beam 56 may be delivered to generate one or more slots 32A, 32B in the target zone 34 (for example, an annulus zone at a casing string and/or a cement layer). The desired and/or optimized shape, size, and/or location of the output laser beam 56 may not compromise the integrity of the casing at the target zone 34.

Referring still to FIGS. 5 and 6, the laser cutting tool 24 may further include a timer 62. The timer 62 may be integrated into the control system 64 of the laser tool system 11 for precisely controlling the predetermined amounts of time to operate the laser cutting tool 24. For example, the laser tool system 11 may be programmed with a plurality of predetermined amounts of time. The laser tool 24 may be activated and run for precisely the predetermined amounts of time. The timer 62 may be controllable to fractions of a second such as tenths of a second, hundredths of a second, and/or milliseconds, as well as microseconds and nanoseconds. In some embodiments, the predetermined amount of time may be determined through experiments. The predetermined amount of time may depend on the target material (for example, carbon steel, stainless steel, alloys, plastic, and/or cement), the thickness of the target zone 34, properties of the purging knife 54, and/or the type of the laser generator 39. In some embodiments, the predetermined amount of time may be at least about 1 second, about 2 seconds, about 3 seconds, about 5 seconds, about 8 seconds, about 10 seconds, about 30 seconds, about 40 seconds, about 60 seconds, about 100 seconds, and about 500 seconds. In one embodiment, the predetermined amount of time may be about 2 seconds to make a cut in a casing that is about 1 inch (that is, about 2.54 cm) thick using a fiber laser, which operates at a power of about 5 kW and emits a laser beam that includes a wavelength of about 1062 nm. In another embodiment, the predetermined amount of time may be from about 40 to about 60 seconds in total to cut a first steel layer (e.g., a first casing) that is about one inch thick, a cement layer that is about 2 inches thick, and a second steel layer (e.g. a second casing) that is about 2 inches thick. In some embodiments, cutting a target from inside may take the same amount of time as cutting the target from outside.

Referring still to FIGS. 5 and 6, the mounting system 48 may support the laser cutting tool 24 to stay still or to rotate with the drill string 22. The laser cutting tool 24 (for example, the entire assembly) may rotate about a longitudinal axis (for example, rotate about an axis parallel to the centerline of the wellbore 12), thereby enabling circular cutting in the wellbore 12.

In some embodiments, according to the present disclosure, the laser cutting tool 24 may operate at a power of at least 1 kW, at least 2 kW, at least 3 kW, at least 5 kW, at least 8 kW, at least 10 kW, at least 12 kW, or at least 15 kW. In one or more embodiments, the laser cutting tool 24 may operate at a power range from about 4 kW to about 6 kW, or from about 4.5 kW to about 5.5 kW, or from about 4.75 kW to about 5.25 kW, or about 5 kW.

In some embodiments, according to the present disclosure, the laser generator 39 operates at a frequency of at least 1 kHz, at least 2 kHz, at least 5 kHz, at least 10 kHz, at least 100 kHz, and at least 500 kHz. In one or more embodiments, the laser generator 39 operates at a frequency from about 2 kHz to about 4 kHz, or from about 2.5 kHz to about 3.5 kHz, or at about 2 kHz. In other embodiments, the laser generator 39 operates at a higher range of frequencies. For example, in some embodiments, the laser generator 39 operates at frequencies from about 100 kHz to about 40 GHz, or from about 200 kHz to about 30 GHz, or from about 500 kHz to about 20 GHz, or from about 1000 kHz (1 MHz) to about 10 GHz, or from about 2 MHz to about 5 GHz, or from about 5 MHz to about 2 GHz, or from about 10 MHz to about 1 GHz, or from about 100 MHz to about 500 MHz, or from about 500 kHz to about 800 kHz, or from about 2 GHz to about 35 GHz.

In some embodiments, according to the present disclosure, the laser generator 39 (for example, fiber laser) generates a laser beam 56 that includes a wavelength of up to 1 nm, up to 10 nm, up to 100 nm, up to 1000 nm, up to 2000 nm, or up to 5000 nm. In some embodiments, the laser generator 39 generates a laser beam 56 that includes a wavelength of about 1060 nm, about 1064 nm, or about 1070 nm. In some embodiments, the laser generator 39 generates a laser beam 56 that includes a wavelength from about 1010 nm to about 1110 nm, or from about 1025 nm to about 1100 nm, or from about 1040 nm to about 1084 nm, or from about 1151 nm to about 1173 nm, or at about 1162 nm.

Referring still to FIGS. 5 and 6, the laser cutting tool 24 may use conventional control systems for adjusting the operation and function of the laser cutting tool 24. The control system may include a control panel located at the surface or operated from a remote location. The power and communications link may be brought downhole to the laser via wireless signals and/or via one or more wireline units with multiple wires.

Figure 7:
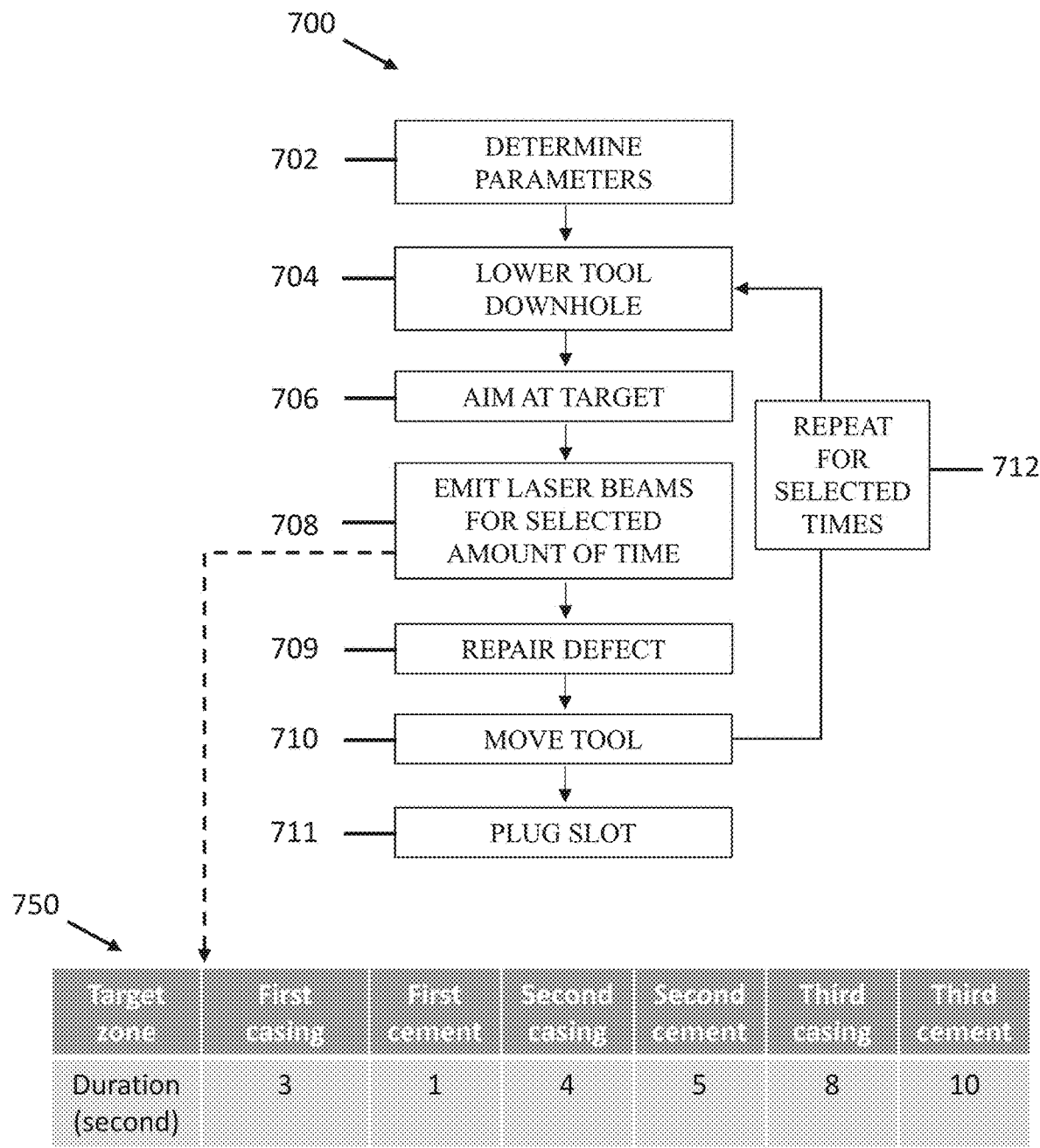
FIG. 7 illustrates a method of operating a laser cutting tool, according to aspects of the present embodiments.

FIG. 7 illustrates a method 700 of operating the laser cutting tool 24 in the wellbore 12, according to aspects of the present embodiments. At step 702, the method 700 may include determining predetermined parameters for operating the laser cutting tool 24. The predetermined parameters may include amounts of time for operating the laser cutting tool 24, numbers of cuts, shapes of a plurality slots, and/or location of slots. In some embodiments, the predetermined amount of time may be determined through experiments. For example, a 3D printer as well as other fabrication or manufacturing processes may be used to produce a testing casing 26 (FIG. 3) for monitoring and/or determining some of the predetermined parameters. At step 704, the method 700 may include lowering the laser cutting tool 24, either manually or automatically, downhole to one predetermined location (for example, depth) in the wellbore 12. At step 706, the method 700 may include operating the laser cutting tool 24 to aim at the target zone 34 (for example, casings and/or cement layers). At step 708, the method 700 may include operating the laser cutting tool 24 to emit the output laser beam 56 to cut at least one slot of the plurality of slots 32A, 32B in the target zone 34 for predetermined amount(s) of time determined at step 702. In some embodiments, a user may simply add more amounts of time associated with more layers in the target zone 34 for cutting through the additional layers (for example, casings or more cement layers).

Referring still to FIG. 7, at step 709, the method 700 may include repairing a defect in a casing (for example, 26A, 26B, or 26C in FIG. 4) or a cement layer (for example, 36A or 36B in FIG. 4) that has been exposed. For example, if the laser cutting tool 24 is used to cut through the first and second casings 26A, 26B and the first and second cement layers 36A, 36B at step 708, the third casing 26C and/or cement (not shown) may now be exposed. Once the third casing 26C and/or cement (not shown) becomes accessible, cracks, defects, and/or other imperfections in the third casing 26C and/or cement (not shown) may be patched, sealed, and/or otherwise repaired. At step 709, the method 700 may include any suitable repair means such as sintering, cementing, sealing, epoxying, plugging, using binder to solidify loose material, applying heat to fuse and/or seal loose material and other portions of the substrate (cement or casing), and/or other suitable means. In some embodiments, the laser cutting tool may be used as a source of heat or energy during the repair process (for example, to remove scaling that has accumulated on a surface and/or to heat epoxy, binder, and/or expeditor to allow a repair or sealant to set more quickly). At step 710, the method 700 may include operating the laser cutting tool 24 by using a control system (64 in FIGS. 5 and 6) to move the laser cutting tool 24 (for example, horizontally or circumferentially rotating the tool 24 by a predetermined degree, or lifting and/or lowering the tool 24 to a predetermined depth through a wellbore) to another predetermined location for cutting through another target zone.

Still referring to FIG. 7, at step 711, the method 700 may include plugging the slot (for example, 32A or 32B) that was formed during step 708 of the process. Because the dimensions of the slot (for example, 32A or 32B) are being tightly controlled, the slots (for example, 32A and 32B) may be designed such that they are easy to plug after repairs to the interior surface or surfaces are complete. For example, plugs of similar size and dimensions of the slots 32A and 32B may be created such that they fit easily into the slots 32A and 32B. As such, it may be desirable for the plugs to have a dimensions that are up to about 1% or 2% smaller than the slots 32A and 32B to allow the plugs to slide into the slots 32A and 32B. In some embodiments, the dimensions of the plugs may be from about 2 mils (that is, 2 thousandths of an inch) to about 100 mils (that is, 100 thousandths of an inch) smaller than the slots. In other embodiments, the dimensions of the plugs may be from about 3 mils to about 80 mils smaller than the slots. In other embodiments, the dimensions of the plugs may be from about 4 mils to about 60 mils smaller than the slots. In other embodiments, the dimensions of the plugs may be from about 5 mils to about 40 mils smaller than the slots. In other embodiments, the dimensions of the plugs may be from about 6 mils to about 20 mils smaller than the slots. In other embodiments, the dimensions of the plugs may be from about 10 mils to about 15 mils smaller than the slots. In some embodiments, the plugs may be pre-treated with binder, epoxy, and/or other heat-activated sealant, hardener, and/or adhesive that allows the plugs to be sealed and hardened into place within the slot. In some embodiments, the pre-treated binder may be applied to the plugs as a thin coating around the outer periphery of the plugs such that it forms a thin sealing layer and/or adhesive between the plugs and the slots 32A, 32B, once the plugs have been inserted into the slots. In some embodiments, the method 700 may include using the laser cutting tool 24 to activate the adhesive, binder, and/or epoxy that is included in the coating around the outer periphery of the plug or plugs.

Referring still to FIG. 7, in each of steps 709 and 711, the method may include operating the laser cutting tool 24 at a lower power setting than at step 708. For example, the laser cutting tool 24 may be operated at a lower power setting for repairing defects and for plugging slots (for example, when used to provide heat to heat-activated binders) than when cutting slots into casings and/or cement layers. At step 712, the method 700 may include repeating at least one of steps 704-710 for predetermined times such that the laser cutting tool 24 makes a complete circular cut horizontally or circumferentially at the target zone 34. The method 700 may include additional steps not shown in FIG. 7. In addition, in some embodiments of method 700, not every step is performed. Method 700 may also include performing steps in a different order than what is shown in FIG. 7. For example, in some embodiments, the method 700 may include performing step 711 (plugging the slots 32A and/or 32B) before step 710 (moving the tool).

Referring still to FIG. 7, the method 700 may include an example 750, which includes a plurality of predetermined amounts of times associated with a plurality of layers (for example, casings or cement layers). For example, it may take the laser cutting tool 24 about 3 seconds to cut through the first (that is, the most inner) casing (for example, 26A in FIG. 4). A user may simply add additional amounts of time to operate the laser cutting tool 24 for cutting through more layers (for example, 36A, 26B, 36B, and/or 26C in FIG. 3). In the example 750, the amounts of time associated with each of the additional layers may include about 1 second for the first cement layer, about 4 seconds for the second casing, about 5 seconds for the second cement layer, about 8 seconds for the third casing, and about 10 seconds for the third cement layer. In some embodiments, a user may add amounts of time associated with the first casing only. In some embodiments, a user may add amounts of time associated with at least the first casing and the first cement layer (for example, if the user wants to cut only though the first casing and the fist cement layer, but not the second casing, or second cement layer). In some embodiments, a user may add amounts of time associated with at least the first casing, the first cement layer, the second casing, and the second cement layer. In some embodiments, a user may add amounts of time associated with at least the first casing, the first cement layer, the second casing, the second cement layer, the third casing, and the third cement layer. In some embodiments, a user may add amounts of time associated with more than the first three casings and the first three cement layers.

Examples of target zones that may be aimed and slotted using the laser cutting tool 24 include casings, liners, tubing, and cement. Examples may also include valves, tubulars, drill pipes, pumps, downhole completion tools, sub-surface safety valves, screens, gravel packs, perforations, and other downhole components, equipment, and systems. By cutting slots 32A, 32B into casings and/or cement layers that are separated longitudinally and/or circumferentially from each other, the systems and methods of the present embodiments may be used to increase the likelihood of accessing an area in need of repair, while simultaneously avoiding continuous cuts, which may compromise the structural integrity of the casing and/or cement layer. Circumferentially and/or longitudinally spaced slots can be used to access the full circumference and/or longitudinal length of a target area, without requiring continuous cuts that span an entire circumference and/or longitudinal length of a casing and/or cement layer. Maintaining tight controls over the shape and operating parameters of the laser cutting tool 24 and resulting laser beam 56 allow slots to be created that include precise dimensions. In addition, by using a laser cutting tool 24 that has both a high power operating mode as well as a lower power operating mode, the laser cutting tool 24 may be used both for cutting casings 26A, 26B, 26C and/or cement layers 36A, 36B, as well as for repairing defects and plugging slots 32A, 32B.

Each of the systems, apparatuses, and components described herein may be deployed downhole (and/or communicated with) via slickline, wireline, linkages (for example, motorized linkages), tools, actuators, cables, and/or other suitable devices and mechanisms. All or part of the tools and processes described in this specification and their various modifications may be controlled at least in part by a control system comprised of one or more computing systems using one or more computer programs. Examples of computing systems include, either alone or in combination, one or more desktop computers, laptop computers, servers, server farms, and mobile computing devices such as smartphones, features phones, and tablet computers.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

Certain Definitions

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, "borehole" or "wellbore" with reference to a claim feature means open-hole or uncased portion of the well.

As used herein, "casing" or "casing string" with reference to a claim feature means pipe lowered into an open-hole and cemented in place to withstand a variety of forces, such as collapse, burst, and tensile failure, and chemically aggressive brines. Casings may be manufactured from plain carbon steel that is heat-treated to predetermined strengths, and they also may be specially fabricated from stainless steel, aluminum, titanium, fiberglass, and/or other materials.

As used herein, "annular space", "annulus", or "annuli" with reference to a claim feature means the space between two concentric objects, such as between the wellbore and casing, between two concentric casings, between casing and tubing, where fluid can flow, between two concentric pipe strings, or between a pipe string and a borehole wall. A pipe string may comprise a drill collar, drill pipe, casing, or tubing.

As used herein, "cement" or "cement layers" with reference to a claim feature means the material used to permanently seal annular spaces between casings, or between casings and borehole walls. Cement may also be used to seal formations to prevent loss of drilling fluid and for operations such as setting plugs and abandonment.

As used herein, "a" or "an" with reference to a claim feature means "one or more," or "at least one."

As used herein, the term "substantially" refers to the qualitative condition of exhibiting total or near-total extent or degree of a characteristic or property of interest.

Equivalents

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laser cutting tool in a wellbore, comprising:
   (a) lowering the laser cutting tool downhole to a first predetermined location;
   (b) operating the laser cutting tool for a first amount of time to cut a first slot in at least one layer of a target zone in the wellbore;
   (c) operating the laser cutting tool to move to a second predetermined location;
   (d) operating the laser cutting tool for a second amount of time to cut a second slot in at least one layer of the target zone;
   (e) repairing at least one defect in an exposed surface after operating the laser cutting tool to cut the first and second slot;
   (f) plugging the first and second slots after repairing the at least one defect; and
   (g) repeating steps (c)-(f) for a predetermined number of time,
      where repairing at least one defect comprises the use of at least one of epoxy, binder, and expeditor, and
      where plugging the first and second slots comprises applying pre-treated binder to the plugs as a thin coat around the outer periphery of the plugs such that the pre-treated binder forms a thin sealing layer between the plugs and the first and second slots.

2. The method of claim 1, where determining a first amount of time comprises using a testing casing, where the testing casing is produced by a 3D printer.

3. The method of claim 1, where the first amount of time is up to about 10 seconds.

4. The method of claim 1, where operating the laser cutting tool to move to a second predetermined location comprises circumferentially rotating the laser cutting tool by a predetermined degree and moving the laser cutting tool to a predetermined depth in the wellbore.

5. The method of claim 1, where the predetermined degree and the predetermined number of times are such that the laser cutting tool makes a complete circular cut at the target zone.

6. The method of claim 1, where the laser cutting tool is operated by a control system, and where the control system comprises at least one collimator to align and control a size, a shape, a location, and an orientation of the output laser beam.

7. The method of claim 6, where the control system comprises a control panel operated from a remote location.

8. The method of claim 1, where the target zone comprises:
   a nested casing,
   where the nested casing comprises at least three casings,
   where the three casings are concentric, and
   where each of the concentric casings includes a different diameter.

9. The method of claim 8, where the nested casing comprises at least a first casings and a second casing, and where the target zone further comprises a first annulus-shaped cement layer disposed between the first casing and the second casing, and a second annulus-shaped cement layer disposed between the second casing and the third casing.

10. The method of claim 9, where the laser cutting tool is used to cut through the first and second casings, and the first and second cement layers, until the third casing becomes accessible to be patched, sealed, and/or otherwise repaired.

11. The method of claim 1, where the slot comprises a circular shape, and
   where lowering the laser cutting tool downhole to a first predetermined location comprises aiming the laser cutting tool at the target zone.

12. The method of claim 1, where the first and second slots are separated by a longitudinal distance and comprise approximately the same dimensions, and
   where the longitudinal distance comprises up to about 200% of a longitudinal length of the first and second slots.

13. The method of claim 1, where the first and second slots comprise a circumferential overlap and comprise approximately the same dimensions,
   where the circumferential overlap comprises up to about 15% of the radial length of the first and second slots.

14. The method of claim 1, where the laser cutting tool operates at a power from about 4.5 kW to about 5.5 kW, the laser cutting tool comprising a laser generator, the laser generator emitting a laser beam,
   where the laser generator operates at a frequency from about 2.5 kHz to about 3.5 kHz, and
   where the laser beam operates at a wavelength from about 1010 nm to about 1110 nm.

15. The method of claim 1,
   where plugging the first and second slots comprises the use of plugs comprising dimensions that are up to about 2% smaller than the respective slots into which they are plugged.

16. The method of claim 15, where the plugs comprise dimensions that are from about 3 mils to about 80 mils smaller than the respective slots into which they are plugged.

17. The method of claim 1, where the laser cutting tool is used as a source of heat during the repair process.

18. A method of operating a laser cutting tool in a wellbore, comprising:
   (a) determining a plurality of amounts of time for operating the laser cutting tool, each time of the plurality of amounts of time corresponding to an amount of time needed to cut a particular shape into a particular layer of a plurality of layers of a target zone in the wellbore;
   (b) lowering the laser cutting tool downhole to a first predetermined location;
   (c) operating the laser cutting tool for a first amount of time of the plurality of amounts of time to cut a first slot in at least one layer of the plurality of layers;
   (d) repairing at least one defect in an exposed surface after operating the laser cutting tool to cut the first slot and
   (e) plugging the first slot after repairing the at least one defect;
   where the plurality of layers comprise at least two concentric layers, each layer comprising at least one of concrete and casing,
   where operating the laser cutting tool for the first amount of time comprises operating the laser cutting tool for a sum of times comprising at least one time of the plurality of amounts of time corresponding to a combined time required to cut the particular shape into one or more concentrically inner layers of the plurality of layers thereby ensuring that at least one concentrically outer layers of the plurality of layers is not cut, where repairing at least one defect comprises the use of at least one of epoxy, binder, and expeditor, and where plugging the first slot comprises the use of at least one plug comprising dimensions that are up to about 2% smaller than the respective slot into which the at least one plug is plugged.

* * * * *